United States Patent [19]

Banerjea

[11] Patent Number: 4,685,721

[45] Date of Patent: Aug. 11, 1987

[54] PLATE TRAILER

[75] Inventor: Tara N. Banerjea, Monticello, Ind.

[73] Assignee: Monon Corporation, Monon, Ind.

[21] Appl. No.: 872,040

[22] Filed: Jun. 9, 1986

[51] Int. Cl.⁴ .......................................... B62D 33/04
[52] U.S. Cl. .................................. 296/181; 296/191; 52/467
[58] Field of Search .............. 296/181, 183, 182, 191, 296/188; 105/409; 52/467 X

[56] References Cited

U.S. PATENT DOCUMENTS

| | | | |
|---|---|---|---|
| 2,384,965 | 9/1945 | Reid | 296/181 |
| 2,620,226 | 12/1952 | Jones | 296/181 |
| 4,357,047 | 11/1982 | Katz | 296/181 |
| 4,546,969 | 10/1985 | Wilson | 296/181 |

FOREIGN PATENT DOCUMENTS 1064547 10/1949 Canada ............................ 296/181

Primary Examiner—Robert R. Song
Attorney, Agent, or Firm—Barnes & Thornburg

[57] ABSTRACT

A trailer body construction includes a floor, a roof, and a pair of sidewalls, each sidewall having at least two groups of generally flat, rectilinear plates of lightweight metallic material of a predetermined width and height aligned in side by side relation. The plates of each group have a uniform thickness with the plates of a first of the two groups being appreciably thicker than the plates of the second of the two groups. The groups of plates are selectively arranged in each sidewall so as to achieve enhanced strength at selected regions of maximum deformation induced stress. A plurality of joining panels of metallic material are situated on only the exterior surface of each sidewall for joining and strengthening respective adjacent pairs of plates.

23 Claims, 8 Drawing Figures

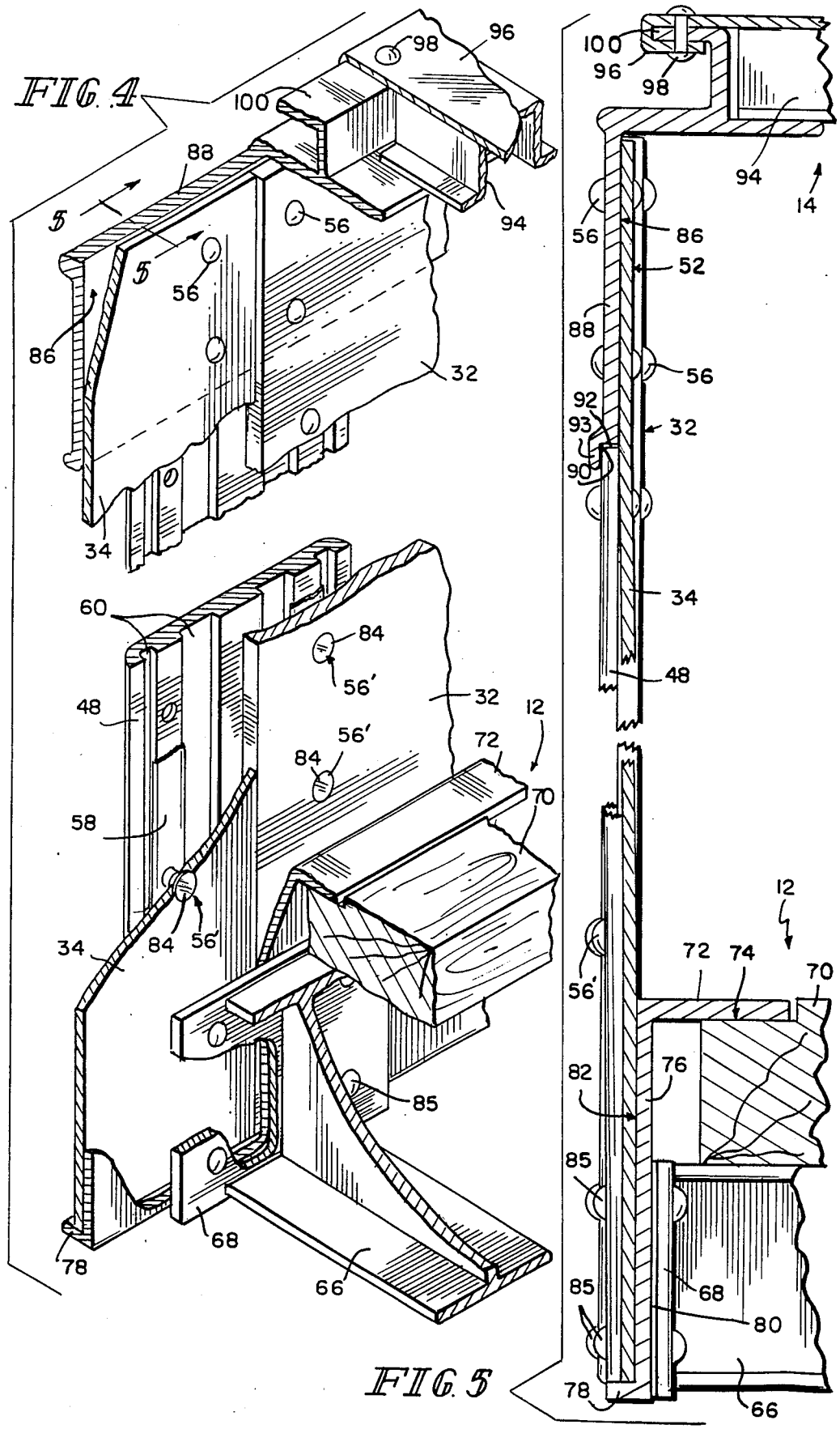

PLATE TRAILER

The present invention relates generally to the construction of freight carrying trailers of the type used in combination with tractor units for over the road travel. The invention particularly relates to the body construction of aluminum plate trailers of a novel construction intended to achieve an improved strength to weight ratio over that available in the prior art.

In recent years, there have been developed a new class of freight-carrying trailers which are essentially frameless. In such trailers, the predominant portion of the load provided by the freight within the trailer is borne by the sides of the trailer body. Examples of such frameless trailers are to be found in Ehrlich, U.S. Pat. No. 3,692,349, and Ehrlich, U.S. Pat. No. 3,788,682. These patents disclose trailers having sides constructed of a unitary plywood panel coated on each face with fiberglass reinforced polyester. Such trailers are commonly designated FRP trailers. While such trailers perform quite satisfactorily, particularly in corrosive environments due to the resistance of the polyester to environmental attack, certain shortcomings are known. In particular, the thickness of the side panels reduces the inner volume of the trailer and thus the cubic capacity of freight which can be carried.

Schmidt, U.S. Pat. No. 4,212,405, discloses such a trailer in which the sides of the trailer are made from a unitary aluminum alloy plate which extends along the entire length of the trailer. While this design meaningfully increased the cubic capacity of such trailers, the design suffered from the difficulty of requiring the handling of very large dimension panels of aluminum plate from its initial production at the manufacturer all the way through the completion of the trailer assembly. The Schmidt design was also difficult to reliably repair for when the aluminum alloy plate was welded, the diminished strength in the heat-affected zone of the weld caused an increased likelihood of failure in subsequent use. Fatigue failure in the heat-affected zone is especially more likely where the repair occurs in the lower half of the side wall which is under significant tension during normal trailer load conditions. Thus reliable repair can be effected only by replacement of an entire side wall of a trailer which presents again the material handling problem presented by original manufacture as well as significant expense. These problems were sought to be avoided while still retaining the advantages of the much thinner sidewall construction.

In commonly assigned patent application Ser. No. 06/705,609 filed Feb. 26, 1985, there is disclosed a trailer construction in which a plurality of aluminum alloy plates are assembled in side by side abutted relationship to form the sidewalls of the trailer. The aluminum alloy plates have a width dimension which is less than their height dimension, and generally are of a size which are easily transported and handled prior to their assembly into the trailer sidewall. A plurality of thin aluminum alloy stiffener panels are used to join the aluminum alloy plates in side by-side relationship. The overall construction has a thickness comparable to that of the unitary aluminum alloy plate construction referred to above, thereby retaining the enhanced cubic capacity of the trailer for freight. In the event of damage to such a trailer, one or more of the plurality of plates can be replaced much more easily and at much lower cost than an entire sidewall.

In the present invention, a further improved trailer body is provided in which each sidewall comprises at least two groups of flat rectilinear plates of lightweight metallic material such as aluminum alloy. The plates are aligned in side by side relation and are joined by a plurality of joining panels situated on the exterior surface of the sidewall. Each group of plates has a uniform thickness but the plates of a first of the at least two groups are appreciably thicker than the plates of a second of the at least two groups. The groups of plates are selectively arranged in each sidewall so as to achieve enhanced strength at selected regions of maximum stress and deformation of the trailer. By proper selection of the location for the two groups of plates, the vertical bending or columning, and high shear stress can be significantly diminished. Further, by positioning the group of thinner plates in the regions of lower stress, the total weight of the trailer can be reduced, thereby enhancing the cargo weight capacity of the trailer while retaining the high freight cubic capacity achieved by previous designs.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIG. 4 is a perspective view partially broken away from the inside of the trailer showing the various elements of a trailer constructed in accordance with this invention.

FIG. 5 is a sectional view of the trailer taken along line 5—5 of FIG. 4.

Figure 1:
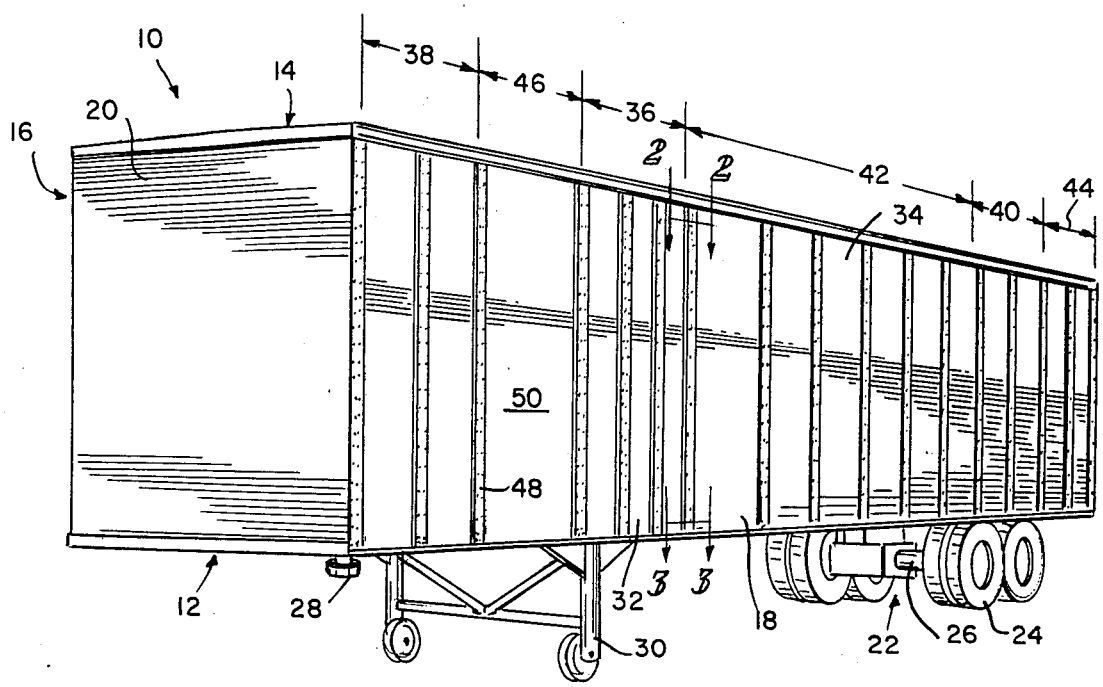
FIG. 1 shows a perspective view of a trailer constructed in accordance with the present invention.

A plate trailer 10 in accordance with the present invention is shown in FIG. 1 to generally comprise a floor 12, a roof 14, and a pair of sidewalls 16 and 18. The trailer body also includes a forward bulkhead 20, a suspension 22 including wheels 24, and one or more axles 26 for supporting a rearward end of the trailer 10. The trailer 10 also includes a kingpin 28 for attachment to the fifth wheel of a tractor in the conventional manner and a landing gear 30 for supporting the trailer 10 when not attached to a trailer.

Each sidewall 16, 18, comprises at least two groups of generally flat, rectilinear plates 32, 34, the plates being of a lightweight metallic material, preferably tempered aluminum alloy. For ease of handling during construction of the sidewall, the plates generally have a height greater than the width. The plates within each group have a uniform thickness. The plates 32 of a first of the at least two groups are appreciably thicker than the plate 34 of a second of the at least two groups.

The groups of plates 32, 34 are selectively arranged in each sidewall 16, 18, so as to achieve enhanced strength at selected regions of maximum stress and/or deformation. The first group of plates 32 are preferably positioned at least in the region 36 immediately above the landing gear 30. The thicker plate 32 is also preferably used in region 38 immediately above the kingpin. The thicker plate can also be advantageously used in region 40 immediately above suspension 22. These three regions may be viewed as reaction points for the combined loads imposed by the trailer body itself and the freight contained within the trailer body. When the trailer is in transit, the two most important reaction points are within the region 38 above the kingpin 28 and within region 40 above the suspension 22. When the trailer is uncoupled from the tractor, the principal reaction point is in region 36 above the landing gear 30. These three combined locations experience high shear stress and vertical bending or columning which the thicker plates resist more successfully.

The thinner plates, 34, are preferably included at least within region 42 between the region 36 immediately above the landing gear and the region 40 immediately above the suspension 22. The lighter weight plates can also be advantageously used in region 44 which is located rearwardly from region 40 above suspension 22. Finally, in region 46 which is situated between region 36 immediately above landing gear 30 and region 38 above kingpin 28, either the thicker or first group of plates 32 or the thinner second group of plates 34 can be employed. This is also true of regions 38 and 40 but to a much lesser extent. In totality, it is preferable that the second lighter weight group of plates 34 be used in the majority of each sidewall.

While the foregoing discussion is related to a preferred embodiment employing merely two groups of plates, it will be appreciated that yet a third or even fourth group of plates having intermediate thicknesses between the first group and second group could be included so as to optimize the strength to weight considerations within each of the regions 36–46 discussed above. For example, a first group of rather thick plates may be employed in region 36, a second group of intermediate thickness plates may be employed in regions 38 and 40 while a thinner-most group of plates may be used in regions 42, 44, and 46.

Figure 2:
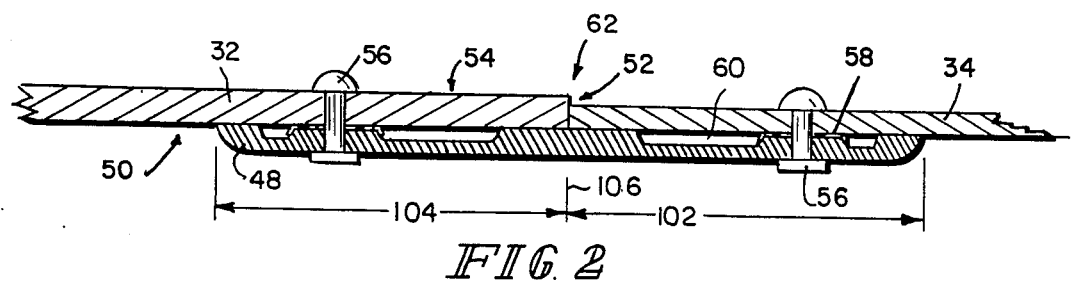
FIG. 2 is a sectional detail view of a portion of the sidewall taken along line 2—2 of FIG. 1.
Figure 3:
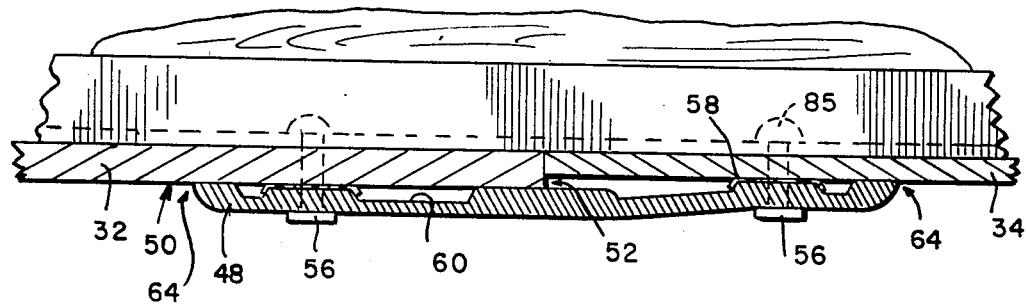
FIG. 3 is a sectional detail view of another portion of the sidewall taken along FIG. 3—3 of FIG. 1.

In each instance, the adjacent plates are joined by a thin panel 48 situated only on the exterior surface 50 of the sidewall 16, 18. Where the two adjacent plates are from different groups, a discontinuity 52 will occur equal to the difference in thickness between the two plates as shown in FIGS. 2 and 3. For reasons which will become more apparent from the following discussion, the discontinuity 52 can be situated on the inside surface 54 at the top of the trailer sidewall as shown in FIG. 2. The discontinuity is found on the outside surface 50 at the bottom of the trailer sidewall as shown in FIG. 3. As discussed later, the discontinuity is found on the outside surface along the entire height of the trailer in the embodiments shown in FIGS. 6–8.

The panel 48 is secured in place by a plurality of rivets 56 or other equivalent fasteners. A strip of sealing material 58 is included between the outside surface 50 and the panel 48 in the immediate vicinity of the rivets 56. The sealing material most advantageously takes the form of a closed cell PVC foam tape of approximately one sixteenth inch thickness. The panel 48 includes a plurality of channels 60 on the surface of the panel 48 adjacent the outside surface 50 of the sidewall. The channels 60 act to decrease the total weight contribution of the panels to the trailer. They further act to conduct any water which might penetrate from a side of the panel 48 down the interior channel toward the floor 12 on the outside of the trailer, thus inhibiting the moisture from entering the trailer through the butted joint 62 of the two adjacent plates 32, 34. Finally, the channels 60 provide an additional measure of lateral flexibility in the panels so as to permit intimate contiguous contact of both edges 64 of the panel even where the discontinuity 52 is on the outside surface 50 of the sidewall as shown in FIG. 3.

A more complete understanding of the position of the discontinuity 52 can be gained by a review of FIGS. 4 and 5 which show a portion of the sidewall of a trailer constructed in accordance with the present invention using a longitudinally symmetric panel 48 as shown in FIGS. 2 and 3. The trailer can comprise a plurality of spaced-apart crossbeams 66 which are transversely situated beneath the floor 12. The crossbeams each include end plates 68 at their opposite ends. A plurality of wood planks 70 or other conventional material is used to form the top surface of the floor on the interior of the trailer 10.

A lower side rail 72 extends longitudinally along the entire length of each side of the floor, typically covering an outer margin 74 of the wood or other material 70 forming the floor 12. A vertical portion 76 of the lower side rail extends downwardly on the outside surface of end plate 68 and terminates in an outwardly extending lower lip or edge 78 extending beneath the plates 32, 34 forming the sidewall. A nonmetallic sheet 80 can be situated between the vertical portion 76 of the lower side rail 72 and the end plate 68 of crossbeam 66 so as to retard any galvanic degradation due to differences in metal composition of the various structural parts of the trailer.

The plates 32 and 34 are positioned in intimate contact with an outer surface 82 of the lower side rail 72, thereby assuring that the inside surfaces 54 of both sheets 32 and 34 are coplanar in the immediate vicinity of the floor 12. Additionally, the rivets 56' immediately above the floor 12 include countersunk heads 84 so as to ensure a smooth continuous surface for at least a reasonable distance of, say, six to twelve inches above the floor 12. This has the advantage of diminishing the likelihood of freight handling problems due to pallets or other similar load-carrying devices catching small protrusions on the inside surface near the floor of the trailer. The intimate contiguous contact between the plates 32 and 34 on the one hand and the outer surface 82 of lower side rail 72 is assured by fasteners 85 which pass through end plate 68, lower side rail 72, plates 32 and 34, as well as panel 48.

At the top of each sidewall, the outer surface of the plates 32 and 34 is secured to the inside surface 86 of top rail 88 by fasteners 56 as shown in FIGS. 4 and 5, thereby forming discontinuity 52 on the inner surface of the trailer. The outer surface 50 is thus made smooth adjacent the bottom edge 90 of top rail 88. A weather tight seal can be further assured between the bottom edge 90 of top rail 88 and the uppermost edge 92 of panel 48 by the presence of overhanging lip 93 extending over the outer surface of the uppermost edge 92. The top rail 88 is shown to be joined to components of the roof 14 in a conventional manner including roof bows 94 and roof sheet 96 which is secured in place by fasteners 98 passing through a top flange 100 of the top rail 88.

In a preferred embodiment of the trailer, the plates 32 of the first group consist essentially of sheets of aluminum having a thickness between about 0.219 and 0.281 inches. In such a trailer, the plates 34 of the second group consist essentially of sheets of aluminum having a thickness of between about 0.156 and about 0.219 inches, there always being a difference in thickness between the two groups of plates. Preferably, the second group of plates 34 have a thickness of about 0.190 inches. The joining panels 48 of such a trailer have a width of about six inches and a height equal to a major fractional portion of the height of plates 34, 36, and a thickness of between about 0.156 and about 0.218 inches. The joining panels 48 are longitudinally symmetric. That is, as best shown in FIG. 2, the right half 102 and left half 104 are mirror symmetric about the midline 106.

Figure 6:
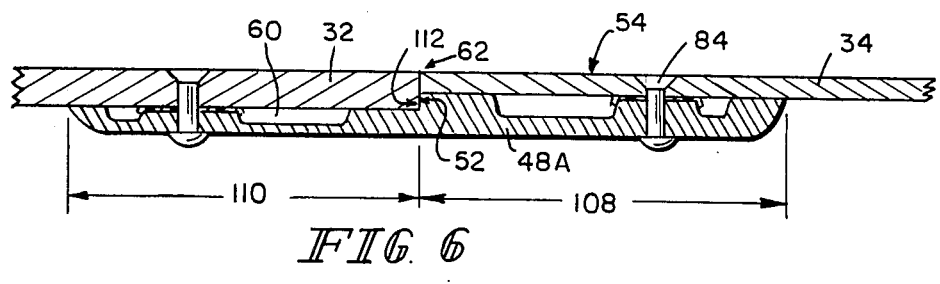
FIG. 6 is a dead sectional view of a portion of the sidewall showing an alternative embodiment of a joining panel.
Figure 7:
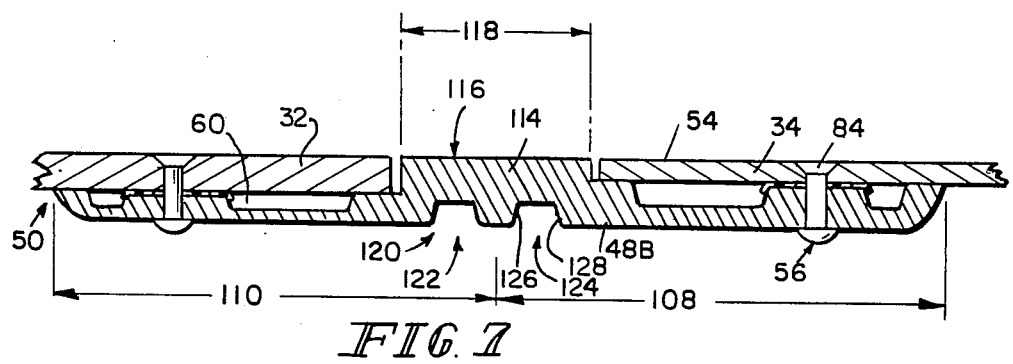
FIG. 7 is a dead sectional view similar to FIG. 6 showing another embodiment of a joining panel.
Figure 8:
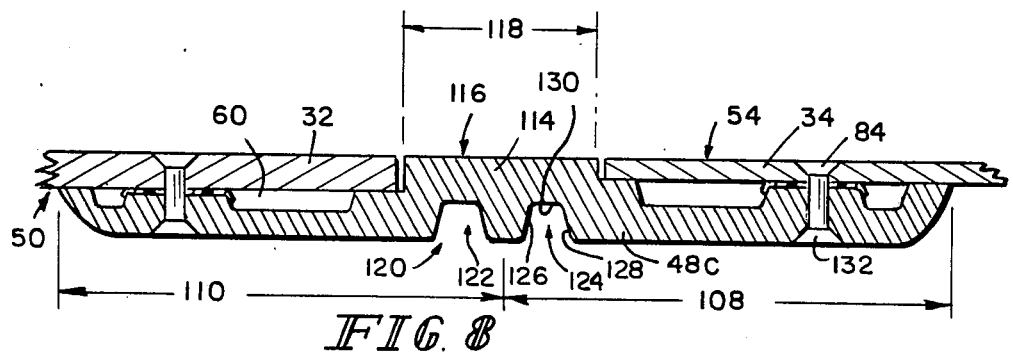
FIG. 8 is a dead sectional view similar to FIG. 6 showing yet another embodiment of a joining panel.

Alternative embodiments for the joining panels 48 are shown in FIGS. 6, 7, and 8 as 48A, 48B, and 48C respectively. In each of the embodiments shown in FIGS. 6–8, the joining panels are longitudinally asymmetric having one longitudinal half 108 of greater thickness than the other longitudinal half 110. The difference in thickness between the two halfs is substantially the same as the difference in thickness between the first and second group of plates 32 and 34. In as much as the panels 48A, 48B, and 48C are preferably extruded members, this difference in thickness exists over the entire length of the panels. This uniform difference in thickness of the longitudinal portions 108 and 110, if appropriately selected, assures a smooth inner surface 54 throughout the entire height of the trailer. This uniformly smooth inner surface over the entire height of the trailer can be achieved in at least two ways.

As shown in FIG. 6, the joining panels 48A includes a longitudinal step 112 of a height equal to the discontinuity 52 which in turn assures a smooth inner butt joint 62. The fasteners are preferably selected to have countersunk heads 84 similar to that shown in FIG. 4. Recessed or countersunk heads 84 are preferably used throughout the vertical length of the sidewall to provide a substantially co-planar inner surface throughout the entire trailer. Each of the panels 48A, 48B, and 48C would only be used for joining plates of two different groups while panels such as panels 48 shown in FIG. 2 would be used throughout the remainder of the trailer for joining plates of the same group.

An alternative means for achieving a smooth inner surface at the juncture of the two groups of plates is shown in FIGS. 7 and 8 wherein the plates of the two groups 32 and 34 are separated by an inside ridge 114 situated between the adjacent plates 32 and 34, the inside ridge 114 having an inside surface 116 which is substantially flush or co-planar with the inside surface 54 of the plates. The joining panels 48B and 48C have a thickened central portion 118 which contributes to a considerably less flexible behavior and hence more resistance to vertical bending or columning than are panels 48 as shown in FIG. 2. The thickness of the thickened central portion 118 is about twice the thickness of the thicker plates 32.

The outer surface 120 of the central portion 118 of panels 48B and 48C are shown to include a pair of grooves 122 and 124. The grooves serve several functions from both a structural and aesthetic point of view. The grooves tend to lighten the overall weight of the panels. They also tend to suggest to the observer a quality of strength or sturdiness which is not necessarily suggested by the smooth exterior of panels 48 and 48A. In the preferred embodiment, each of the grooves 122 and 124 comprises side surfaces 126 and 128 terminating in a groove bottom 130 which is situated substantially in the same plane as is the front surface 50 of the thicker plates of group 32. Additional strenthening of the panels can be achieved as shown by post 48C by increasing the thickness by a dimension equal to the rivot head dimension of rivot head 56 and countersinking the outer head 132 as well as the inner head 84 of the fasteners. The thicker joining panel 48C can include enlarged and/or deepened lightening channels 60 without adversely affecting the strength of the joining panel 48C.

The dimensions of the plates 32, 34 and panels 48, 48A, 48B, 48C, as well as the length of crossbeams 66 situated below floor 12, are most desirably selected so as to maximize the interior width between the interior surfaces 54 of sidewalls 16 and 18, yet maintain sufficient strength particularly in regions 36, 38, and 40 so as to ensure maximum cubic load capacity and freight weight while minimizing the empty trailer weight.

Although the invention has been described in detail with reference to the illustrated preferred embodiment, variations and modifications exist within the scope and spirit of the invention as described and as defined in the following claims.

What is claimed is:

1. A trailer body construction comprising a floor, a roof, and a pair of sidewalls, each sidewall comprising at least two groups of generally flat, rectilinear plates of lightweight metallic material of a predetermined width and height aligned in side by side relation, the plates of each group having a uniform thickness, the plates of a first of the at least two groups being appreciably thicker than the plates of the second of the at least two groups, the groups of plates being selectively arranged in each sidewall so as to achieve enhanced strength at selected regions of maximum deformation induced stress, and a plurality of joining panels of metallic material situated on only the exterior surface of each sidewall for joining and strengthening respective adjacent pairs of plates, the joining panels each consisting essentially of a narrow rectilinear strip of aluminum alloy having a width equal to a minor fractional portion of the width of said plates, having a height equal to a major fractional portion of the height of said plates, and having a thickness no greater than about twice the thickness of the plates of the first of the at least two groups.

2. The trailer body construction of claim 1 further comprising a lower side rail member extending along the length of each sidewall having an outwardly facing planar surface contiguous to the inner surface of the plates so as to form a smooth, continuous interior surface on each sidewall adjacent the floor at the junction of plates of different groups.

3. The trailer body construction of claim 2 further comprising an upper side rail member extending along the length of each sidewall having an inwardly facing planar surface contiguous to the outer surface of said plates so as to form a smooth exterior surface on each sidewall adjacent said roof.

4. A trailer construction in accordance with claim 1 wherein the plates of the first group consist essentially of sheets of aluminum having a thickness of between about 0.219 and about 0.281 inches.

5. A trailer construction in accordance with claim 1 wherein the plates of the second group consist essentially of sheets of aluminum having a thickness of between about 0.156 and about 0.219 inches.

6. A trailer construction in accordance with claim 5 wherein the plates of the second group have a thickness of about 0.190 inches.

7. The trailer body construction of claim 1 wherein the joining panels each have a thickness of between about 0.156 and about 0.281 inches.

8. The trailer construction in accordance with claim 2 wherein the upper siderail includes an overhanging lip on a lower edge and wherein the upper end of each joining panel is situated between the plates and the overhanging lip on the upper siderail member.

9. A trailer construction in accordance with claim 1 wherein the joining panels each include on a surface contiguous to the plates a plurality of longitudinal channels.

10. A trailer body construction comprising a floor, a roof, and a pair of sidewalls, each sidewall comprising at least two groups of generally flat, rectilinear plates of lightweight metallic material of a predetermined width and height aligned in side by side relation, the plates of each group having a uniform thickness, the plates of a first of the at least two groups being appreciably thicker than the plates of the second of the at least two groups, the groups of plates being selectively arranged in each sidewall so as to achieve enhanced strength at selected regions of maximum deformation induced stress, and a plurality of joining panels of metallic material situated on only the exterior surface of each sidewall for joining and strengthening respective adjacent pairs of plates, the joining panels each consisting essentially of a narrow rectangular strip of aluminum alloy of a width equal to a minor fractional portion of the width of said plates and a height equal to a major fractional portion of the height of said plates, and include on a surface contiguous to the plates a plurality of longitudinal channels, a selected number of the joining panels which join plates of two different groups being longitudinally asymmetric having one longitudinal half of greater thickness than the other longitudinal half.

11. The trailer body construction of claim 10 wherein the selected number of the joining panels which join plates of two different groups further include a longitudinal step dimensioned to reflect the difference in thickness of the two groups of plates, the plates being situated adjacent to each other in a butting relationship.

12. The trailer body construction of claim 10 where in the selected number of joining panels which join plates of two different groups further include an inside ridge situated between adjacent plates, the inside surface of the ridge being substantially flush with the inside surface of the adjacent plates.

13. The trailer body construction of claim 12 wherein the joining panels include on an outer surface at least one groove, the at least one groove being situated substantially opposite the inside ridge.

14. The trailer body construction of claim 13 wherein the at least one groove is defined by a pair of side surfaces extending from the outer surface of the panel to a grooved bottom, the grooved bottom being situated nearly coplanarly with an outer surface of an adjacent plate.

15. The trailer body construction of claim 9 further comprising a plurality of fasteners fastening each joining panel to the adjacent plates, the fastener ends being configured to form smooth exterior and interior surfaces.

16. The trailer body construction of claim 1 further comprising a king pin, a landing gear, and a rear suspension, and wherein the first group of plates are situated immediately above the landing gear.

17. The trailer body construction of claim 16 wherein the first group of plates are also situated immediately above the king pin.

18. The trailer body construction of claim 17 wherein the first group of plates are also situated immediately above the rear suspension.

19. The trailer body construction of claim 16 wherein the major portion of the length of each side of the trailer is composed of the second group of plates.

20. The trailer body of claim 19 wherein the second group of plates is situated between the landing gear and the rear suspension.

21. A trailer body construction comprising a floor, a roof, and a pair of sidewalls, each sidewall comprising at least two groups of generally flat, rectilinear plates of lightweight metallic material of a predetermined width and height aligned in side by side relation, the plates of each group having a uniform thickness, the plates of a first of the at least two groups being appreciably thicker than the plates of the second of the at least two groups, the groups of plates being selectively arranged in each sidewall so as to achieve enhanced strength at selected regions of maximum deformation induced stress, and a plurality of joining panels of metallic material having a width equal to only a minor fractional portion of the width of the plates, the joining panels being situated on only the exterior surface of each sidewall for joining and strengthening respective adjacent pairs of plates, the adjacent pairs of plates of two different groups being arranged in skewed relation to each other to form at the junction thereof a smooth, continuous interior surface on each sidewall adjacent the floor and a smooth, continuous exterior surface on each sidewall adjacent the roof.

22. The trailer body construction of claim 21 further comprising an upper siderail member extending along the length of each sidewall having an inwardly facing planar surface contiguous to the outer surface of said plates, the upper siderail including an overhanging lip on a lower edge and wherein the upper end of each joining panel is situated between the plates and the overhanging lip on the upper siderail member.

23. A trailer construction in accordance with claim 21 wherein the joining panels each include on a surface contiguous to the plates a plurality of longitudinal channels.

* * * * *